C. A. HIRTH.
LEATHER SKIVING MACHINE.
APPLICATION FILED MAY 22, 1909.

958,124. Patented May 17, 1910.

Witnesses:
J. J. McCarthy
L. Hockinson.

Inventor:
Carl A. Hirth
by Foster Freeman Watson & Coit
Attorneys

# UNITED STATES PATENT OFFICE.

CARL ALBERT HIRTH, OF CANNSTATT, GERMANY.

LEATHER-SKIVING MACHINE.

958,124.   Specification of Letters Patent.   Patented May 17, 1910.

Application filed May 22, 1909. Serial No. 497,687.

*To all whom it may concern:*

Be it known that I, CARL ALBERT HIRTH, a subject of the German Emperor, residing at Cannstatt, Stuttgart, in the German Empire, have invented a new and useful Improvement in Leather-Skiving Machines, of which the following is a specification.

The invention relates to a leather skiving machine, by means of which the edges of perforations in the work can be worked without the necessity of turning the work up. For this purpose the machine is so arranged that the pressing-member—for instance, a presser-foot, guide-roller or feed-roller—which is situated in the working side opposite the cutter can be temporarily removed from the cutter by means of a special contrivance, whereby it is possible to move the work over the place where the skiving is effected without its being affected by the cutter. The backward movement of the pressing-member, is limited so that when the pressing-member has been carried into the effective position it is always at precisely its former distance from the cutter. When a stop is employed for the work it is desirable that this stop should be raised and lowered simultaneously with the pressing-member.

Figure 1:
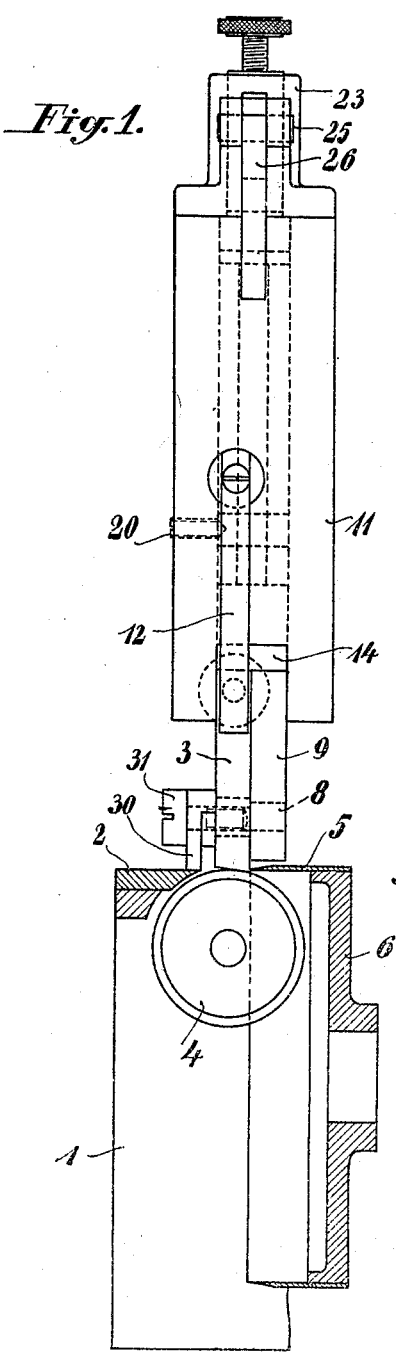
Figure 2:
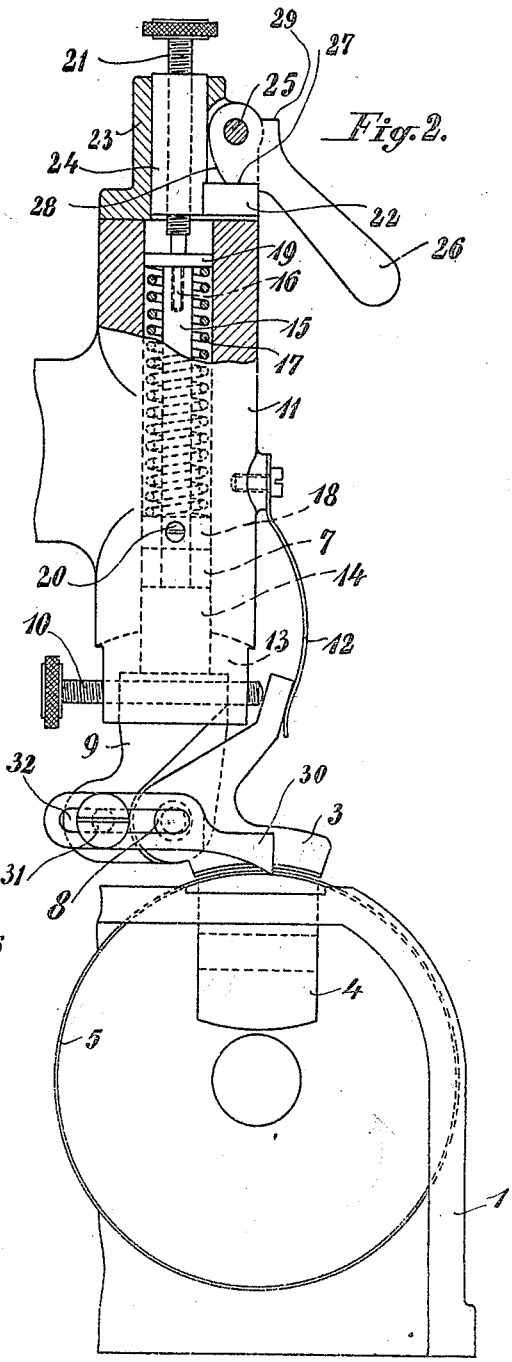

In the accompanying drawings, Figure 1 is a side elevation of one construction of leather skiving machine according to this invention and Fig. 2 is a front elevation of the same. In both of the figures some of the parts are shown in section.

The work is placed between the pressing-member 3 and the feed-roller 4 on the table or support 2 provided on the frame 1 of the machine, the work being gripped by the feed-roller which moves it against the cutter 5. In the form of the machine illustrated the pressing-member 3 is, as usual, in the form of a presser-foot and the cutter consists of an annular knife which is fixed on the knife block 6 and rotates therewith.

The pressing-member 3 is mounted on a pin 8 so as to pivot on the slide 9 and can be adjusted at any desired angle in relation to the surface of the cutter by means of the screw 10 mounted upon the slide 9. A spring 12, which is fixed to the head piece 11 of the machine frame, acts against the screw 10. The slide 9 moves with its lower flat part in a slot 13 and with its upper cylindrical part 14 in a correspondingly shaped recess 7 formed in the head-piece 11 and is furnished at the top with a pin 15 into which a screw 16 with a broad head 19 is screwed. Below this screw and about the pin 15 a spiral spring 17 and the spring seat 18 are forced, the latter being fixed in the head-piece by means of a screw 20.

Against the head 19 of the screw 16, a screw 21 bears from above, and this screw 21 can be screwed into a slide 24 that is furnished with a lateral extension 22 and moves in the extension 23 of the head 11. In the extension 23, a hand lever 26 is pivoted on a pin 25. In the position illustrated the extension 22 lies against the surface 27 of this lever under the influence of the spring 17.

By means of the screws 21 and 10 the pressing foot can be accurately adjusted in regard to height and inclination in relation to the edge of the cutter, as is desired for the work to be effected. If now the inner edge of a perforation is to be pared or any other paring work to be performed, in connection therewith it is desirable that the work should be moved over the cutter without being affected thereby, the hand lever 26 is turned upward until the stop 29 comes against the extension 23. Meanwhile the extension 22 of the slide 24 slides on the surface 28 of the hand-lever and the spring 17 raises the slide 9 with the pressing foot 3 so far that sufficient space is created between the pressure-foot and the knife 5 to allow the work to pass through without injury. When the lever 26 is turned backward its surface 28 presses the slide 24 and the screw 21 as well as the slide 9 with the pressing foot 3 against the action of the spring 17 back again into precisely the same position as before, so that the skiving can be promptly begun. The "running out" of the work requires the pressure-foot to be again raised.

When it is required to skive only within a certain distance of the edge of the work, a stop 30 serves as a guide and enables the work to be skived only along its margin. If such a stop be employed it must of course be temporarily raised in order that it may "run in" with the work. The device for actuating the stop may be so combined with the device for actuating the presser-foot that the latter and the stop are actuated simultaneously. It is advisable that the parts which support the presser-foot and the stop should be rigidly connected together. In the arrangement illustrated this is effected by arranging the stop 30 on the under part of the slide 9 itself. The stop is fixed in the slide 9 by means of a screw 31, that passes through a slot 32 in the backward extension of the stop, and it can be moved and inclined on this as desired, whereby it can be adjusted or be put entirely out of action as required.

What I claim is:

1. In a leather-skiving machine the combination of a cutter, means for feeding the work to the cutter, means for pressing the work against the feeding-means, means for adjusting the pressing-means in relation to the feeding-means, resilient means tending to move the pressing-means away from the work, and positive means for moving the pressing-means exactly to its working position the said position being independent of the thickness of the work.

2. In a leather-skiving machine the combination of a cutter, means for feeding the work to the cutter, means for pressing the work against the feeding means, means for guiding the work, and means whereby the pressing- and guiding-means can be simultaneously moved away from the work and subsequently simultaneously returned each to its former position.

3. In a leather-skiving machine the combination of a cutter, means for feeding the work to the cutter, means for pressing the work against the feeding-means, means whereby the pressing-means can be moved away from the work and subsequently returned to its former position exactly, means for guiding the work, and means whereby the guiding-means can be moved away from the work and subsequently returned to its former position exactly.

4. In a leather-skiving machine the combination of a cutter, means for feeding the work to the cutter, a member that presses the work against the feeding-means, means for adjusting the pressing-member in relation to the feeding-means, a slide carrying the pressing-member, resilient means tending to move the slide away from the work, and positive means for moving the slide to the position in which the pressing-member is ready for working the said position being independent of the thickness of the work.

5. In a leather-skiving machine the combination of a cutter, means for feeding the work to the cutter, a slide adapted to move toward and away from the cutter, a pressing-member adjustably mounted upon the slide, resilient means tending to move the slide away from the work, and positive means for moving the slide to the position in which the pressing-member mounted thereon is in its working position the said position being independent of the thickness of the work.

6. In a leather-skiving machine the combination of a cutter, means for feeding the work to the cutter, a slide adapted to move toward and away from the cutter, a presser-foot pivotally mounted upon the slide, a set-screw mounted in the slide and adapted to rock the presser-foot toward the feeding-means, resilient means acting upon the presser-foot and tending to rock it away from the feeding-means, resilient means tending to move the slide away from the work, and positive means for moving the slide to the position in which the pressing-member mounted thereon is in its working position the said position being independent of the thickness of the work.

7. In a leather-skiving machine the combination of a cutter, means for feeding the work to the cutter, a member that presses the work against the feeding-means, a stop that guides the work, a slide on which both the pressing-member and the stop are mounted, and means whereby the slide can be moved away from the work and subsequently returned to its former position exactly.

8. In a leather-skiving machine the combination of a cutter, means for feeding the work to the cutter, a slide adapted to move toward and away from the cutter, a pressing-member mounted upon the slide, means for adjusting the pressing-member toward and away from the work, a stop for guiding the work said stop being mounted upon the slide, means for adjusting the position of the stop upon the slide, and means whereby the slide may be moved away from the work and subsequently returned to its former position exactly.

9. In a leather-skiving machine the combination of a cutter, means for feeding the work to the cutter, a slide adapted to move toward and away from the cutter, a pressing-member mounted upon the slide, a stop for guiding the work said stop being mounted upon the slide and capable of being temporarily removed from the working position, and means whereby the slide may be moved away from the work and subsequently returned to its former position exactly.

10. In a leather-skiving machine the combination of a cutter, means for feeding the work to the cutter, a member that presses the work against the feeding-means, a slide that carries the pressing-member and that is adapted to move toward and away from the work, means whereby the normal position of the slide can be adjusted, resilient means tending to move the slide away from the work, and positive means for moving the slide to the position in which the pressing member mounted thereon is in its working position the said position being independent of the thickness of the work.

11. In a leather-skiving machine the combination of a cutter, means for feeding the work to the cutter, a member that presses the work against the feeding-means, means for adjusting the pressing-member in relation to the feeding-means, a slide that carries the pressing-member and that is adapted to move toward and away from the work, resilient means tending to push the slide away from the work, positive means adapted to force the slide toward the work into the position in which the pressing-member mounted thereon is in its working position the said position being independent of the thickness of the work, and adjustable means acting upon the slide and in opposition to the resilient means for varying the normal position of the pressing-member.

In testimony whereof I have hereunto set my hand in the presence of two subscribing witnesses.

CARL ALBERT HIRTH.

Witnesses:
CARL GAISER,
FRIDA KLAIBER.